PHASE COMPARISON RADIO RECEIVER

Filed Aug. 9, 1967 Sheet 1 of 3

INVENTOR.
WARREN H. FLARITY
BY Carl R. Brown
attorney

INVENTOR.
WARREN H. FLARITY
BY Carl R. Brown
Attorney

May 20, 1969 W. H. FLARITY 3,445,845

PHASE COMPARISON RADIO RECEIVER

Filed Aug. 9, 1967 Sheet 3 of 3

INVENTOR.
WARREN H. FLARITY

BY Carl R. Brown
Attorney

United States Patent Office 3,445,845

Patented May 20, 1969

3,445,845

PHASE COMPARISON RADIO RECEIVER

Warren H. Flarity, La Jolla, Calif., assignor to Ryan Aeronautical Co., San Diego, Calif.

Filed Aug. 9, 1967, Ser. No. 659,526
Int. Cl. G01s *1/30*
U.S. Cl. 343—105 9 Claims

ABSTRACT OF THE DISCLOSURE

A phase comparison radio receiver for receiving a plurality of transmitted radio signals and determining the phase difference between the radio signals in which, the radio signals are modulated by a modulating frequency and are phase detected by a divided frequency of the modulating frequency to provide the phase information and also to provide an error signal to the source of the modulating frequency that holds the modulating frequency stable relative to the frequency of the radio signals.

*Background of the invention*

Figure 1A:
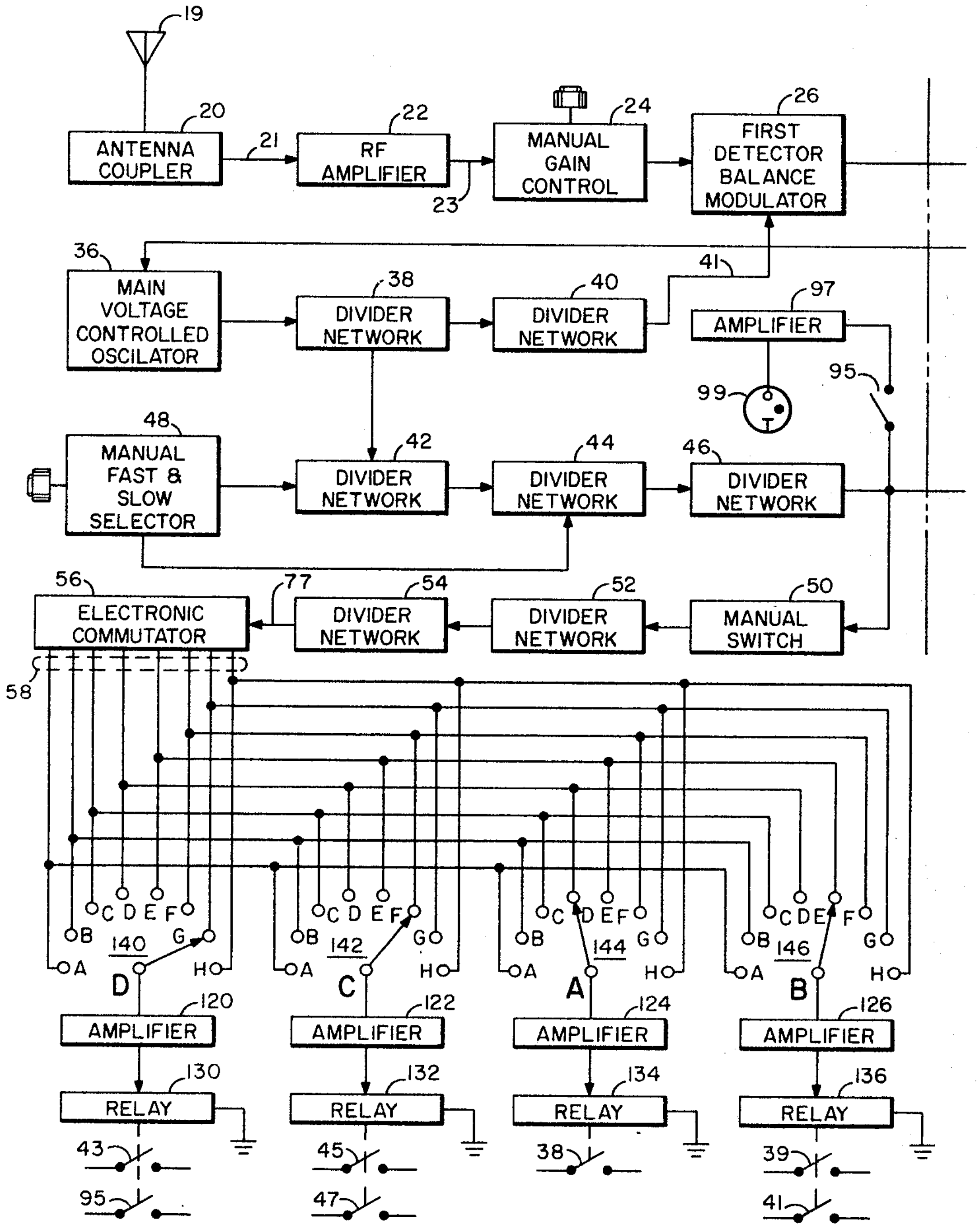

Radio signals propagated by a radio transmitter have a specific wave length that may be measured in linear units, such as meters or miles. Thus the distance between a radio transmitter station and a radio receiver station may be expressed as a number of wave lengths at the frequency of the propagated signal, or in linear units. Signals propagated from two spaced radio transmitter stations at the same frequency and wave length that arrive at a point in an integral number of half wave lengths from both stations are in phase. If the point or position is less than an integral number of half wave lengths from one or both of the stations, the signals are then out of phase. These wave lengths and phase characteristics may be used, knowing the wave lengths as measured in linear units, for fixing a receiver station position relative to two or more known transmitter stations transmitting at the same frequency.

Should the radio receiver be positioned at a known location, then it is possible to determine distance movement of the radio receiver station by determining the change in phase relationship of the transmitted signals received. This change in phase relationship and thus change in location of the radio receiver station may be continuously recorded and plotted to establish the position of the radio receiver station for movement of the radio receiver station over long distances.

In a typical position indicating system that may be used in a navigation system based on the hyperbolic method of navigation, land based radio transmitter stations send out signals having the same frequency and a radio receiver station positioned between a pair or more radio transmitting stations measures the time of arrival of the wave lengths from each of the radio transmitting stations and in turn determines by phase measurement the position of the radio receiver stations within the half wave length of the transmitted frequency. Thus in the typical system, a single frequency is repeatedly transmitted by several radio transmitting stations at periodic time intervals. The radio transmitters repeat the phase information and the radio receiver station is a continuous following device that is energized at a given location and continuously tracks the change in phase relationship between the respective transmitting stations.

In such a system there are charts having printed thereon hyperbolic lines between the radio transmitting stations with each line being spaced at half wave or equal phase intervals. Consequently, each line indicates an equal phase line of position and the intersection of a pair of such lines indicates an equal phase point. Also, since the hyperbolic lines are drawn relative to known positions of the radio transmitter stations, an equal phase point represents a known position. Additionally, out of phase points between the half wave lines may be determined by interpolation as indicated by the measured phase difference between the respective radio transmitting stations. Thus the radio receiver station is able to receive the transmitted signals, compare and measure the relative phase of the received transmitted signals, convert the relative phase data into position information and record the position information on a continuous basis thereby tracking the position of the radio receiver station.

*Summary of the invention*

In the illustrative embodiment of my invention, an antenna receives the periodically transmitted radio signals from the spaced radio transmitters and modulates the received signals with a voltage controlled oscillator frequency signal. These modulated radio signals are then fed to a plurality of phase detector circuits. These phase detector circuits compare the phase of the received signals to establish the phase relationship which is recorded to determine by the known linear length of the wave length, the distances represented by the differences in phase.

A commutator circuit periodically switches on different ones of the phase detector circuits in synchronism with the transmitting time of the resceptive radio transmitting stations so that the phase detectors are oriented to receive the transmitting signal from a particular transmitting station.

A particular transmitting station, such as for example, the first radio transmitting station signal received, is modulated and supplied to a first phase detector circuit that detects differences in frequency and phase between the incoming signal and the modulating frequency signal from the voltage controlled oscillator. The first phase detector circuit thus determines the difference in phase and frequency and provides an output voltage, called an error signal, that is applied to the voltage controlled oscillator causing the oscillator to correct its output frequency and phase signal to phase lock with the first or reference radio transmitting station signal received. This orients the receiver to a given frequency and phase of the wave length received at the known location. The other phase detectors subsequently receive signals from the other radio transmitting stations and determine the phase difference between these signals received to determine the position relative to the half wave length relationship of the receiver station to the radio transmitting stations.

Thus my invention is capable of receiving and determining the phase relationship of a plurality of radio transmitted signals received from a plurality of radio transmititng stations and thereby continuously determine their phase relationship to continuously determine and track the position of the ratio receiver station.

It is, therefore, an object of this invention to provide a new and improved radio receiver capable of measuring the phase difference between selected input signals.

Figure 1B:
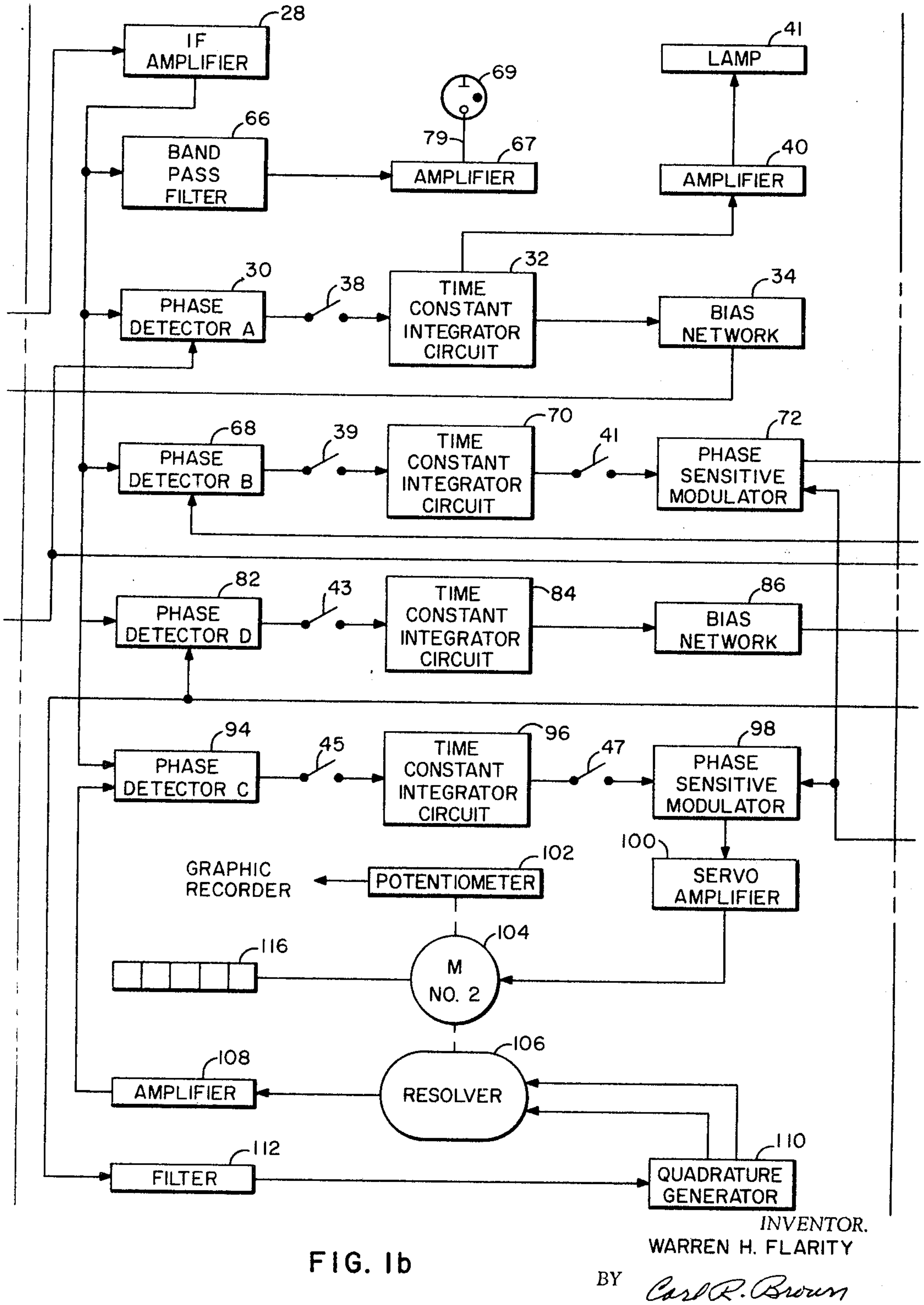
Figure 1C:
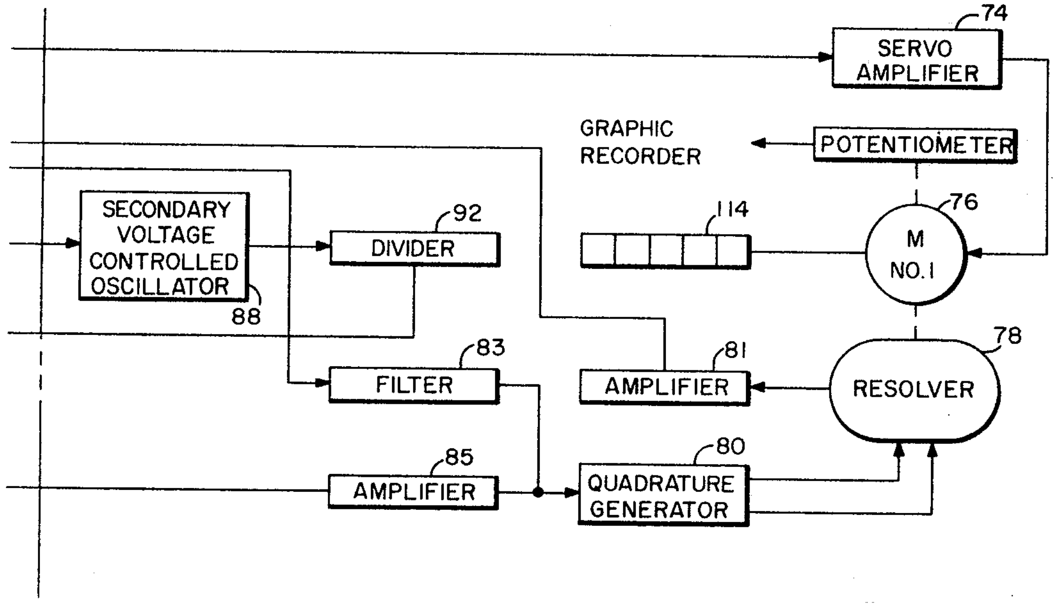

Other objects and advantages will become more apparent upon a reading of the following detailed description and a reference to the drawing in which like parts are designed by like reference numerals and in which:

FIGURES 1A, 1B, and 1C illustrate an embodiment of the receiver and recorder of my invention.

Figure 2:
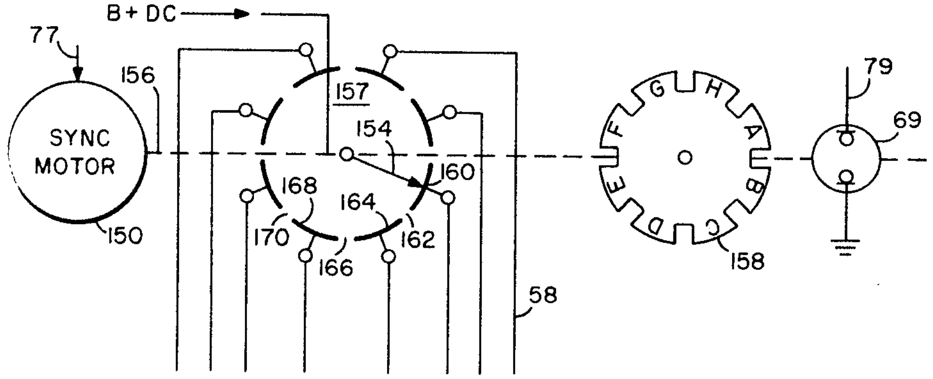

FIGURE 2 is an illustration of a mechanical type commutator for use in my invention.

Referring now to FIGURES 1A, 1B, and 1C, the incoming radio transmitted signals, which for the purposes of this description may have a standard frequency of 10.2 kc., are received by the antenna 19 and transformed from the high impedance characteristics of the antenna 19 to a low impedance characteristic by means of antenna coupler 20. The antenna coupler 20 is normally physically located at the antenna 19. A coaxial line 21 feeds the low impedance signal from the antenna coupler 20 into the receiver which is normally positioned at a remote location. The RF amplifier 22 has a plurality of stages, each of which amplify and clip the incoming signals, and is tuned to preserve the zero crossing characteristics of the incoming signals over wide dynamic changes and to limit the amplitude characteristics. The input signals may vary considerably in signal amplitude, as for example from 5 microvolts to 500 microvolts, because of the carrying distances from the several separate radio transmitting stations. Since it is advantageous that all the output signals in line 23 for all the input signals be substantially the same magnitude, the RF amplifier amplifies and limits the incoming signals of the 10.2 kc., as an example, and raises the signals to a working level with the phase information in the input signals being preserved linearly through the several stages of amplification and limiting. The signal in line 23 is fed to the manual gain control 24, which is a simple potentiometer, and then to the first detector balance modulator 26.

The main voltage controlled oscillator 36, which may comprise an oven controlled crystal oscillator or have other suitable stable oscillator construction that is capable of developing a precise and stable frequency base, provides a base frequency that for this explanation has a frequency output of 1.334 mc. The exact frequency and phase of the output of the main voltage controlled oscillator 36 is controlled by the output signal voltage of the bias network 34 in a manner that will be described hereinafter. At this point is is sufficient to state that the output frequency of the main voltage controlled oscillator 36 is divided by divider network 38 and 40 to provide a stable frequency signal in line 41 of 10.5 kc. and is divided by divider network 42, 44 and 46 to provide a stable frequency signal output of 300 c.p.s. The fast and slow selector allows manual adjustment of the output frequency and phase of divider network 46.

The first detector balance modulator 26 mixes the 10.2 kc. input signals of the incoming station signals with their phase information from the main gain control 24 and the 10.5 kc. signal in line 41 and develops an intermediate frequency of 300 c.p.s. that inturn is amplified by the IF amplifier 28 and is fed to the four phase detector circuits A, B, C, and D. The signal output of IF amplifier 28 is also fed to band pass filter 66, which signal is amplified by amplifier 67 and applied through line 79 to a signal light 69 that, for example, may be a neon tube 69. The changing brilliancy of the lamp 69 indicates the reception of a signal from a station. The band pass filter 66 has a narrow band that can be in the order of three cycles per second and that is adjustable to discriminate against noise while having a band wide enough to pass all signals of interest from the various stations. The signal indicator 69 functions to set the receiver for the original synchronization of the commutator with the incoming station signals in a manner that will be explained in detail hereinafter.

The phase detector circuit A comprising phase detector A 30, time constant integrator circuit 32 and bias network 34 has several functions. One of those functions is to phase lock the main voltage controlled oscillator 36 frequency and phase to a particular incoming radio transmitting station signal that has the same frequency as all the incoming stations signals and to the particular phase of the radio signal from the particular incoming station. It is necessary that the main oscillator frequency output be set to the exact frequency of the signals being received and also be set to the phase of the reference transmitting station signal, so that the phase difference between the reference station and another station can be detected and the distance coordinates be determined and recorded.

The system as herein described determines the location of the radio receiving station from four radio transmitting stations, however it should be understood that more radio transmitting station signals can be received and used as desired, thus providing a more accurate system.

The phase detector circuit A establishes the frequency relationship of one incoming signal with the frequency of the main voltage controlled oscillator 36 and orients the other phase detector circuits B, C, and D to the frequency of this signal. The commutator is so coordinated and adjusted with the antenna 19 that switch 38 is closed at the particular time sequence of receiving this particular signal. The phase detector circuit A thus receives, during the sampling process, the incoming signal that has been received by antenna 19 from the radio transmitting station whose signal it is desired to use as the reference signal or as the reference station No. 1.

The phase detector 30 functions as a balanced modulator and detects the difference in phase between the frequency output of divider network 46 and the frequency from the IF amplifier 28 and provides a substantially direct current output proportional to the difference in phase. The DC error signal is fed to the time constant integrator circuit 32 that, in conjunction with the bias network 34, provides an output voltage proportional to the phase difference to the main voltage controlled oscillator 36. This error signal voltage to the main voltage controlled oscillator 36, controls its frequency output or basically the phase position of the local oscillator signal through the divider network 38 and divider network 40 to the first detector balance modulator 26. Thus the phase detector circuit A becomes the first memory circuit, phase locks on one particular station as the reference station No. 1, and frequency orients the entire system. The phase difference between this reference frequency output of the main oscillator 36 and phase of the signal from the reference station No. 1 become zero in the phase lock circuit A when the DC output of the error signal from phase detector 30 becomes zero.

The time constant integrator circuit 32 also provides an output signal to amplifier 40 and indicator lamp 41 that is proportional to the magnitude of the error signal from phase detector 30. The brilliance of lamp 41 reflects the phase offset of the main voltage control oscillator 36 and the lamp 41 extinguishes when the frequency and phase of the reference signal from reference signal station No. 1 and the output of the main voltage control oscillator 36 through the divider networks is the same.

The bias network 34 includes a potentiometer with a coordinated resistance network and power supply. This potentiometer bias network is adjusted as necessary during set-up of the equipment or in operation, to keep lamp 41 extinguished and the phase detector circuit A and the reference frequency and phase of the main oscillator 36 signal phase locked to the incoming reference signal from the reference station No. 1.

As the commutator 56 moves to the next station, it shifts the relay energizing voltage from line D that is connected to the A switching network 144 to line E in a sequence that will be described in more detail hereinafter. Thus relay 134 is de-energized and switch 38 is opened in the normal manner. With switch 38 open, the time constant integrator circuit 32 holds the level of the last signal until the next sampling period. Thus the bias voltage from bias network 34 is continued to be supplied to the main voltage controlled oscillator 36 maintaining the frequency and phase of the signals to the first detector balance modulator 26 and the phase detector circuits A, B, C and D.

The signal on line E through amplifier 126 at switch B energizes relay 136 and closes switches 39 and 41, thereby turning on the phase detector circuit B in synchronism with the reception of the second or next signal from the radio transmitting station. The signal from the second radio transmitting station has the same frequency of 10.2 kc. and is processed through the input circuits in the same manner as previously described. However this second input signal does not provide any error signal to the main voltage controlled oscillator 36.

The phase detector 68 develops a DC error voltage output that is fed to the time constant integrator circuit 70 and inturn is fed to the phase sensitive modulator 72. The phase sensitive modulator is essentially a chopper circuit that changes the DC voltage output of the time constant integrator circuit 70 to an AC voltage output that is then amplified by servo amplifier 74 to drive motor No. 1. The motor 76 has a rotational velocity or movement that is proportional to the signal from servo amplifier 74. The 300 c.p.s. AC signal, hereafter called phase detecting frequency that is developed by the output of the frequency divider network 46 is applied to filter 83 and inturn to the quadrature generator 80. The output of the quadrature generator 80 is applied to the resolver 78 and the output of the resolver 78 gives a particular phase position, as determined by the rotational mechanical position of the rotor of the resolver 78. This resolver 78 output is applied to amplifier 81 and inturn to the phase-detector 68. The second station radio transmitted signal that is applied to phase detector 68 and the phase detecting frequency coming from amplifier 81, are modulated producing the error signal driving the motor 76 and the resolver 78 that is mechanically connected to the motor. This gives the difference in phase between the first station radio transmitted signal or reference signal No. 1 that was applied to phase detector circuit A and the second station radio transmitted signal applied to phase detector circuit B. This phase difference between the two transmitting stations becomes a mechanical position of the resolver 78 that by its position measures the phase difference.

Also connected to the resolver 78 and motor 76 is a read out 114 that provides position read out showing the phase difference as controlled by the resolver. Every time a complete revolution of 360 degrees occurs in the resolver 78, the read out as an odometer type counter, will record each count of 360 degree rotation. This read out reads what are considered lanes or a complete rotation of 360 degrees of the resolver 78, which is the phase difference between a pair of radio transmitting stations. Potentiometer 77 is connected mechanically with the resolver 78 and the first drum of the counter 114 in a one to one ratio. The potentiometer 77 is used to record the position of the resolver 78 within any part of the 360 degree position of the resolver and is used to drive a graphic recorder for history purposes. The DC current to phase sensitive modulator 72 that provides the driving voltage to the servo amplifier and motor 76 is modulated or chopped by the output of filter 83 and is amplified by amplifier 85.

The electric commutator 56 now switches voltage to line G of lines 58, shutting off the phase detector circuit B by opening switch contacts 39 and 41 and energizing relay 130 of switch D closing switch contacts 43 and 95. This switching of commutator 56 is in synchronism with the reception of the radio transmitted signal from radio transmitter station No. 3. This input signal is processed in the same manner through the input circuits as previously described relative to the radio transmitted signals No. 1 and No. 2.

The phase detector 82 in response to the phase information signal from IF amplifier 28 provides a DC error signal through switch 43 to the time constant integrator circuit 84 which feeds a signal to bias network 86 that applies the error signal to the secondary voltage controlled oscillator 88. The second voltage controlled oscillator 88 creates a second phase detecting frequency that is phase locked with the input signal from the fourth radio transmitting station.

The output of the secondary voltage output control oscillator 88 is applied to a divider 92 to obtain the second phase detecting frequency which is applied in turn to the phase detector 82 and essentially becomes a phase lock loop in comparison to the input signal from the third radio transmitting station. When the AC voltage from the secondary voltage controlled oscillator 88 and frequency divider 92 are exactly in phase with the third input signal, then no error signal is developed by the phase detector 82. If the second phase detecting frequency is not in phase with the incoming third input signal, an error signal is developed by the phase detector 82 and inturn through the time constant integrator circuit 84 and bias network 86 applies an error voltage to change the frequency or phase position until a match up occurs.

It should be noted at this point that the phase detectors actually develop phase lock signals 90 degrees out of phase with reference to the input radio transmitted signals in each of the four phase detectors A, B, C and D.

The electric commutator now switches voltage to line F of line 58 thereby energizing relay 132 at switch C and closing switch contacts 45 and 47, turning on the phase detector circuit C and turning off the phase detector circuit D in synchronism with receiving the input radio transmitting signal from the fourth station. The phase detector 94 receives the phase information signal and provides a DC error signal to the time constant integrator circuit 96, phase sensitive modulator 98, and to a servo amplifier 100 which inturn drives motor 2 in the manner previously described. The phase lock and phase difference measurement are in turn set up by resolver 106 and the same process is repeated as previously described relative to resolver 78. The fourth station input signal is phase locked with the phase detecting frequency developed by the secondary voltage controlled oscillator 88 and frequency divider 92, and a phase difference measurement is made by resolver 106 between the input signals from the third radio transmitting station and the fourth radio transmitting station. This phase difference measurement is read out on both potentiometer 102 to drive a graphic recorder and the mechanical read out indicator 116.

Each of the four possible station selections for phase detector circuits A, B, C, and D are commutated by means of an electronic or mechanical commutator 56 and station switches or selectors 140, 142, 144, and 146. Each station is selected by a hand controlled knob. To set up, for example phase detector circuit A to correspond to a given input radio transmitter station signal, the station selector A is turned to any one of the eight segments that correspond to the sampling current or voltage as set up by the commutator corresponding to the correct incoming station signal. The same procedure is used to set up phase detector circuits B, C, and D as corresponding to the station selectors B, C, and D.

The electronic or mechanical commutator is a switch that repeats its cycle every 10 seconds. Within the 10 second period, it will turn one of eight lines 58 on, one at a time, in a repeating sequence of approximately one second for each line. This pattern is set up according to the transmission periods of each radio transmitting station.

In setting up the station selectors, all station selectors can be and under paricular conditions of test, are set up to the same line of lines 58 and under those conditions a zero position of resolver 78 and resolver 106 and inturn the counters 114 and 116 is established. The amplifier 97 amplifies the original phase detecting frequency obtained from frequency divider network 46 and supplies voltage to lamp 99 whenever switch 95 is closed. Switch 95 is closed by stations selector D and is used in setting up the original synchronization of the receiver to the incoming input stations. The method of synchronizing the receiver to the incoming stations is to adjust the manual gain control 24 until only one input station signal excites the lamp 69. For any particular area, it would be a common knowledge as to which radio transmitting signal station provides the strongest signal and therefore by such previous knowledge it would be known that when the gain control is turned down to a position where only one station is on, the strongest station is identified. The manual switch 50 is used to start and stop the commutator as is necessary in manually synchronizing the system.

The mechanical commutator, see FIGURE 2, is very similar in operation to the electronic commutator and accomplishes the same purpose. The commutator amounts to exciting any one of 8 lines 58 for a short period of time, once every 10 seconds. The mechanical commutator consists of a synchronous motor 150, a switch rotating continuously 157, and a dial 158. The synchronous motor is excited by an AC signal in line 77 of such a frequency as to operate the synchronous motor to turn the commutator 157 and dial 158 once every 10 seconds. Divider networks 52 and 54 provide such an AC signal. The dial 158 is fastened to the shaft of the commutator and inturn has a one to one ratio with the commutator since they both rotate together. The dial has slots cut to correspond to the station format of each segment. The lamp 69, which is excited by the incoming input signals, is used with the slots for the original synchronization set up of the receiver to synchronize the commutator with the incoming stations.

*Operation*

In operation, the input signals from the several radio transmitting stations that transmit signals in spaced time interval sequences, are received by antenna 19 and are amplified and clipped by the RF amplifier 22. The signals are applied to the first detector balance modulator 26 and are modulated with a frequency that is provided by the frequency divider networks 38 and 40 from the base frequency provided by the main voltage controlled oscillator 36. The IF amplifier 28 amplifies the hetrodyned output of the first detector balance modulator 26 to the phase detectors A, B, C and D.

The commutator 56, in the manner previously described, selectively applies current in a given time sequence to the lines 58. This inturn applies current to individual lines A through H of the respective stations A, B, C and D. When the current on one of lines 58 corresponds, as for example a current on line D at station A, then the amplifier 124 amplifies this voltage energizing relay 134 that closes switch 38. It is possible through control of the electronic commutator in the described manner to alter its sequence sufficiently to correlate the time of energizing a given line 58 with the time of receiving a particular input signal as indicated by the indicator lamp 69. Accordingly the sequencing of the commutator 56 and the time of transmission of the transmitting stations are correlated.

At the time a signal is received, as for example a signal from a first reference station, then switch 38 is closed and the phase detector 30 receives the phase information signal from the IF amplifier 28 and modulates this signal with the 300 c.p.s. output from the divider network 46. The phase detector 30 mixes the two signals and provides a voltage output that corresponds in magnitude with the phase difference between the two identical frequencies of the signals received. Since only a phase detection is involved, the output voltages are substantially DC. The DC voltage is applied to the time constant integrator circuit 32 that integrates and holds the voltage and provides an output voltage to the bias network 34 that is in turn fed to the main voltage controlled oscillator 36. Should the frequencies between the main voltage controlled oscillator output through divider networks 38 and 40 not correspond with the frequency of the input radio transmitted signals, then this feed back network causes the main voltage control oscillator to adjust its frequency until the frequencies become equal. In addition, in the phase detector circuit A should the phases of the two signals be different as reflected by the phase of the frequency signal output of the main voltage controlled oscillator 36 through the divider network 46 output, then this phase is also adjusted until the phases are equal. Thus the phase detector circuit 30 phase locks the main voltage controlled oscillator and its output frequency signal from divider network 46 with the frequency and phase of the reference station input signal received by antenna 19.

The electric commutator 56 now switches to the next station B and provides a current to line E that causes relay 36 to close switches 39 and 40 energizing phase detector B for receiving the second input signal from a second displaced transmitting station.

The phase detector 68 mixes this signal with phase detecting frequency from divider network 46 through filter 83, quadrature generator 80, resolver 78 and amplifier 81. The phase detector 68 thus modulates the phase difference between the two signals and applies a DC error signal to the time constant integrator circuit that integrates and holds this voltage which is applied to a phase sensitive modulator that also receives a beat signal from the divider network through divider network 46, filter 83 and amplifier 85. Thus the phase detector B detects the phase difference between the frequency and phase of the first station signal received by phase detector A as reflected through the output of the divider network 46 and the output of the resolver 78 and the second station signal. This phase sensitive modulator 72 output to the servo amplifier 74 thus reflects this difference in phase by an AC voltage output that energizes the motor No. 1. Motor No. 1 turns the resolver 78.

When the phase of the phase detecting frequency signal received from the divider network 46 becomes identical with the input signal, a zero error signal from phase detector 68 is fed to the time constant integrator circuit 70. Thus it may be seen that the motor has turned the resolver to a corresponding position relative to the phase difference between the phase information signal received from the two input stations. The graphic recorder and counter records this phase relationship. Thus a continuing recording and adjusting of these phase relationships is translated into a numerical output 114 that is correlated with the wave length of the signal frequency being transmitted to establish a linear distance relationship corresponding to the difference in phase of the input signals.

The electronic commutator then moves to energize line G of line 58 thus de-energizing relay 136 and energizing relay 130. This opens contacts 39 and 41 and closes circuits 43 and 95 that in turn de-energizes the phase detector circuit B and turns on the phase detector circuit D. Accordingly the next received station signal is processed in the manner previously described with the signal being applied to the turned on phase detector circuit D. The phase detector circuit D modulates this input signal with an output of a second voltage controlled oscillator circuit 68 and determines the frequency and phase difference between these two signals. This difference is applied to the time constant integrator circuit that in turn provides a hold voltage to the bias network that provides an error signal to the second voltage controlled oscillator and causes this oscillator to provide a frequency signal output that is divided through divider 92 to correspond with the same frequency and phase of the input signal applied to the phase detector 82. This output signal from the second voltage controlled oscillator 68, that has been corrected to correspond with the phase and frequency of the input signal, is applied through filter 112 to a quadrature generator 110.

The electronic commutator now applies a current to line F of the lines 58, dropping relay 130 and opening switches 43 and 95 and lifting relay 132 closing switches 45 and 47. Thus the phase detector circuit C is turned on to be receptive to the next input signal and phase detector circuit D is de-energized. Phase detector circuit C modulates the input frequency signal from the fourth input station with the output of the amplifier 108, which is the frequency signal of the second voltage controlled oscillator 88 that has the frequency and phase of the third input signal received by the phase detector circuit D. The phase detector circuit C thus receives this signal and provides an error signal having a magnitude proportional to the phase difference therebetween that provides an output voltage through the phase sensitive modulator 98. The phase sensitive modulator 98 modulates the input from the time constant integrator circuit 96 with the input frequency phase oriented signal from the divider network 46 as applied through amplifier 85 and thus provides an AC voltage to the servo amplifier 100 that in turn energizes the motor 104 and records the phase difference.

The commutator 56 passes through the remainder of the lines 58 in a given time sequence and then energizes stations A through line D in the time sequence that the antenna 19 is receiving the input signals from the transmitting stations corresponding to the stations that were previously received. Thus the entire process repeats itself and continues to repeat itself as the motor and resolver continually adjust and turn the graphic recorder providing an output representative of the phase difference and thus linear distance between the transmitting stations and the receiver station.

While I have shown and described a specific form of my invention, it is to be understood that various changes and modifications may be made without departing from the spirit of the invention as set forth in the appended claims.

Having thus described my invention, I now claim:

1. In a radio receiver, the combination comprising,
frequency generating means for generating a modulating frequency,
means for receiving and amplifying a plurality of input signals having the same frequency and different phases,
means for modulating said input signals with said modulating frequency producing phase information signals having a given frequency with different phases,
frequency dividing means for dividing said modulating frequency to a phase detecting frequency,
said phase detecting frequency and said phase information signals having the same frequency,
phase detector means responsive to said phase information signals for measuring the phase difference between selected ones of said input signals,
and said phase detector means in response to said phase detecting frequency and said phase information signals providing an error signal to said frequency generating means that causes said modulating frequency to hold to a stable frequency relative to the frequency relative to the frequency of the input signals.

2. In a radio receiver as claimed in claim 1 in which,
said phase detector means comprises a plurality of pairs of phase detector circuits,
and switching means for selectively turning on in sequence individual ones of said phase detector circuits for individually receiving said phase information signals for corresponding ones of said input signals.

3. In a radio receiver as claimed in claim 2 in which,
each of said pairs of said phase detector circuits having means for measuring the phase difference between pairs of said phase information signals.

4. In a radio receiver as claimed in claim 2 in which,
a first phase detector circuit for each of said pairs of phase detector circuits being electrically connected to a voltage controlled oscillator,
said frequency generating means being the voltage controlled oscillator for one of said first phase detector circuits,
each of said voltage controlled oscillators providing a phase detecting frequency,
each of said first phase detector circuits being responsive to said phase detecting frequency and one of said phase information signals for providing an error signal,
and said error signal being applied to the respective ones of said voltage controlled oscillators.

5. In a radio receiver as claimed in claim 4 in which,
said first phase detector circuit having integrator hold circuit means for integrating said error signal and holding said error signal controlled voltage on said voltage oscillator.

6. In a radio receiver as claimed in claim 4 in which,
a second phase detector circuit of said phase detector means for detecting the phase difference between said one of said information signals and a second phase information signal for a second input signal,
and recording means for recording said phase difference.

7. In a radio receiver as claimed in claim 1 in which,
said phase detector means being responsive to said phase information signals and said phase detection frequency for measuring the phase difference between selected ones of said input signals.

8. In a radio receiver as claimed in claim 6 in which,
a first phase detector circuit for a second pair of phase detector circuits being electrically connected to a second voltage ontrolled oscillator,
said second voltage controlled oscillator providing a second phase detecting frequency,
said first phase detector circuit for said second pair of phase detector circuits being responsive to said second phase detecting frequency and another of said phase information signals for providing a second error signal,
said second error signal being applied to said second voltage controlled oscillator,
a second phase detector circuit of said second pair of phase detector circuits for detecting the phase difference between said another of said phase information signals and still another of said phase information signals,
and recording means for recording said phase difference.

9. In a radio receiver as claimed in claim 1 in which,
said frequency generating means comprises a voltage controlled oscillator,
said phase detector means in response to one of said phase information signals corresponding to one of said input signals said error signal as an error signal voltage to said voltage controlled oscillator,
and said voltage controlled oscillator in response to said error signal providing said modulating frequency with a stable frequency and phase relative to the frequency and phase of said one of said input signals.

References Cited

UNITED STATES PATENTS

| | | | |
|---|---|---|---|
| 2,768,374 | 10/1956 | Rust | 343—105 |
| 3,206,752 | 9/1965 | White | 343—105 |
| 3,209,356 | 9/1965 | Smith | 343—105 |
| 3,348,225 | 10/1967 | Barnard | 343—105 X |
| 3,380,056 | 4/1968 | Adams et al. | 343—105 |

RICHARD A. FARLEY, *Primary Examiner.*

HERBERT C. WAMSLEY, *Assistant Examiner.*

U.S. Cl. X.R.

325—341, 423